US009835873B2

United States Patent
Chen

(10) Patent No.: US 9,835,873 B2
(45) Date of Patent: Dec. 5, 2017

(54) SPECTACLE STRUCTURE WITH TRANSFORMABLE FRAMES

(71) Applicant: PROHERO GROUP CO., LTD., Tainan (TW)

(72) Inventor: Pen-Wei Chen, Tainan (TW)

(73) Assignee: Prohero Group Co., Ltd., Tainan (TW)

(*) Notice: Subject to any disclaimer, the term of this patent is extended or adjusted under 35 U.S.C. 154(b) by 82 days.

(21) Appl. No.: 15/149,656

(22) Filed: May 9, 2016

(65) Prior Publication Data

US 2017/0322427 A1    Nov. 9, 2017

(51) Int. Cl.
| | |
|---|---|
| *G02C 1/08* | (2006.01) |
| *G02C 1/04* | (2006.01) |
| *G02C 5/04* | (2006.01) |
| *G02C 5/12* | (2006.01) |
| *G02C 9/02* | (2006.01) |

(52) U.S. Cl.
CPC ............... *G02C 1/08* (2013.01); *G02C 1/04* (2013.01); *G02C 5/04* (2013.01); *G02C 5/12* (2013.01); *G02C 5/122* (2013.01); *G02C 9/02* (2013.01); *G02C 2200/08* (2013.01)

(58) Field of Classification Search
CPC ... G02C 1/02; G02C 1/04; G02C 1/08; G02C 5/122; G02C 2200/08; G02C 1/10; G02C 5/04; G02C 5/12; G02C 5/22; G02C 5/2209; G02C 9/02

USPC .............. 351/76, 85, 86, 90, 103, 137
See application file for complete search history.

(56) References Cited

U.S. PATENT DOCUMENTS

| | | | | |
|---|---|---|---|---|
| 5,467,148 A | * | 11/1995 | Conway | G02C 1/04 351/103 |
| 5,703,669 A | * | 12/1997 | Park | G02C 1/04 351/106 |
| 5,790,230 A | * | 8/1998 | Sved | A61F 9/025 351/110 |
| 2013/0000019 A1 | * | 1/2013 | Okuma | A61F 9/025 2/443 |
| 2014/0059747 A1 | * | 3/2014 | Belbey | A61F 9/028 2/431 |

* cited by examiner

*Primary Examiner* — Jordan Schwartz
(74) *Attorney, Agent, or Firm* — Rosenberg, Klein & Lee

(57) ABSTRACT

This invention is related to a spectacle structure with transformable frames. An upper frame and a lower frame of the spectacle structure mainly have corresponding lens assembling parts. A fixing part is pivotally connected to an assembling rod of the upper frame. A connection section against the assembling rod of the upper frame is disposed in the lower frame. A carrying part of the fixing part support the bottom of the connection section. A positioning flange stops in front of the connection section to combine the upper frame and the lower frame to be as one frame. Accordingly, the upper and the lower frames can be detached to transform between a half-rimmed spectacles and a full-rimmed spectacles depending on needs.

5 Claims, 6 Drawing Sheets

SPECTACLE STRUCTURE WITH TRANSFORMABLE FRAMES

BACKGROUND

Field of Invention

The disclosure relates to a spectacle structure with transformable frames. More particularly, the disclosure relates to assembling or disassembling an upper frame and a lower frame of the spectacle structure with transformable frames to transform between a half-rimmed spectacles and a full-rimmed spectacles.

Description of Related Art

According to the uses and functions, spectacles can be divided into optical spectacles, sunglasses, sport spectacles, and safety spectacles. The designs for various kinds of spectacles are different. For example, full-rimmed spectacles can completely encapsulate the peripheral of the lenses to provide safer protection to the lenses, and thus is usually used in optical spectacles. Half-rimmed spectacles have a lighter weight than full-rimmed spectacles. Therefore, sunglasses and sport spectacles usually use half-rimmed spectacles to increase the light and convenient feelings of the outdoor activities and constructions.

Since the preferences and needs are different for different peoples, the spectacles stores usually need to prepare various kinds of full-rimmed and half-rimmed spectacles for customers. Hence, the operation cost of the spectacles stores is increased. Furthermore, in addition to the basic functions of protection and vision correction, the spectacles also become an important accessory for the modeling and dressing. For consumers liking new and changing, they often choose various kinds of half-rimmed and full-rimmed spectacle frames to go with their modeling and dressing in various occasions. Therefore, the consumers used to wear spectacles may have optical spectacles and sunglasses. The consumers using spectacles to go with their modeling and dressing may additionally have full-rimmed spectacles and half-rimmed spectacles. Purchasing so many spectacles is not only an economic burden but also a storage trouble. Moreover, the unused spectacles are idle to produce waste of material resources.

Accordingly, in view of the available spectacle frames limited by either the half-rimmed or the full-rimmed design as well as causing the buying and selling burden of the consumers and the spectacles stores, the inventors develop this invention by the many-year manufacturing and design experience and knowledge in the related fields and ingenuity.

SUMMARY

This invention is related to a spectacle structure with transformable frames. A main aspect of this invention is to provide a spectacle structure with transformable frames that can be transformed between a half-rimmed spectacles and a full-rimmed spectacles.

In light of the forgoing, the spectacle structure with transformable frames comprising:

an upper frame, comprising an upper lens assembling part having a lower-half opening; an assembling rod mounted on a rear side of the upper lens assembling part in the central part of the upper frame; and a fixing part pivotally connected to the assembling rod via a rear terminal of the fixing part, wherein the fixing part comprises a flat carrying part extended forward from a rear side thereof, and a positioning flange extended upward from a front terminal of the carrying part; as well as a lower frame, comprising a nose pad part in an inverted-V shape disposed on a central part of the lower frame; two lower lens assembling parts each having an upper-half opening and disposed on two sides of the nose pad to be assembled with the upper lens assembling part to form an intact lens assembling part; and a first notch located on the front and rear sides of a central upper part of the nose pad part in the inverted-V shape to form a thin connection section on the central upper part of the nose pad part, wherein a rear surface of the connection section is against the front surface of the assembling rod of the upper frame, and the carrying part of the fixing part is against the bottom of the connection section, and the positioning flange of the fixing part stops at a front side of the connection section.

In the spectacle structure with transformable frames above, the upper frame further comprises a first pivot hole located at a bottom of the assembling rod; two lugs disposed on two rear sides of the fixing part and respectively having a second pivot hole corresponding to the first pivot hole at the bottom of the assembling rod; and a pivot penetrating the first pivot hole of the assembling rod and the second pivot holes of the lugs to pivotally connect the assembling rod and the fixing part.

In the spectacle structure with transformable frames above, the assembling rod of the upper frame sequentially comprises a first straight section connected to the upper lens assembling part, a backward inclined section connected to the first straight section, and a second straight section connected to a bottom of the inclined section.

In the spectacle structure with transformable frames above, the upper frame further comprises a first pivot hole located at a bottom of the second straight section of the assembling rod; two lugs disposed on two rear sides of the fixing part and respectively having a second pivot hole corresponding to the first pivot hole, wherein the bottom of the assembling rod is located between the two lugs; and a pivot penetrating the first pivot hole of the assembling rod and the second pivot holes of the lugs to pivotally connect the assembling rod and the fixing part.

In the spectacle structure with transformable frames above, a rear terminal surface of the connection section has a shape corresponding to the inclined section and the second straight section of the assembling rod of the upper frame to against the front terminal surface of the assembling rod of the upper frame.

Accordingly, the spectacle structure with transformable frames can actively change the forms of half-rimmed spectacles and full-rimmed spectacles. Therefore, only a spectacle frame is needed to buy for the consumers to change the forms between half-rimmed spectacles and full-rimmed spectacles, and the economic cost for buying spectacle frames can be saved. For spectacle stores, they don't need to place the full-rimmed spectacles and half-rimmed spectacles on the shelf to provide choices for the consumers, and the operating costs can thus be decreased. Moreover, the upper frame and the lower frame can present different color and patterns to increase the trendy and fashionable feelings to meet the needs of the innovating and changing consumer market, and the competitiveness of the foregoing spectacle structure can be further increased.

DETAILED DESCRIPTION

To more completely and clearly illustrate the technical means and effects of this invention, the detailed descriptions are set forth below. Please refer to the disclosed figures and the reference numbers.

Figure 1:
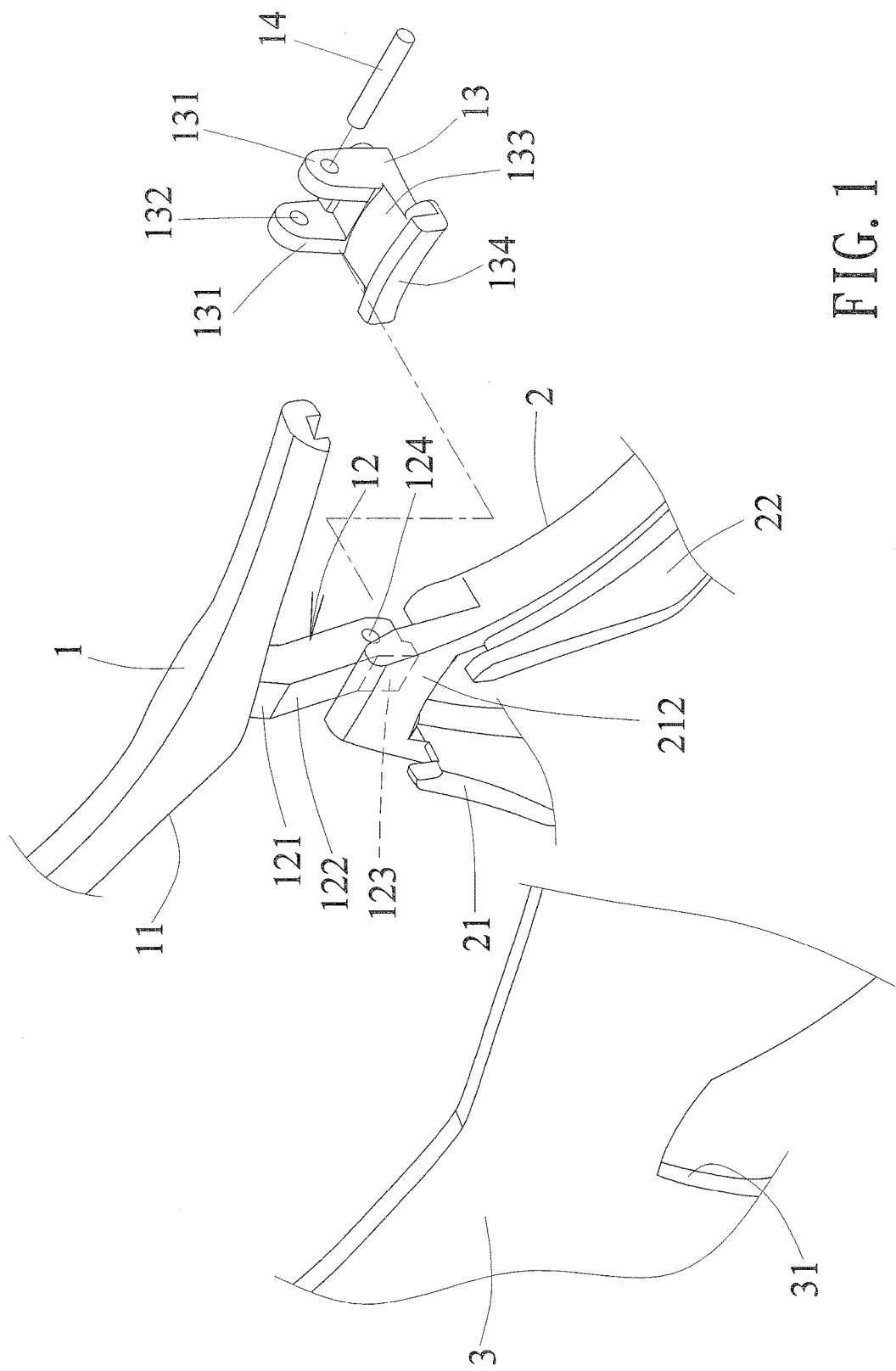
FIG. 1 is a front perspective exploded diagram of this invention.
Figure 2:
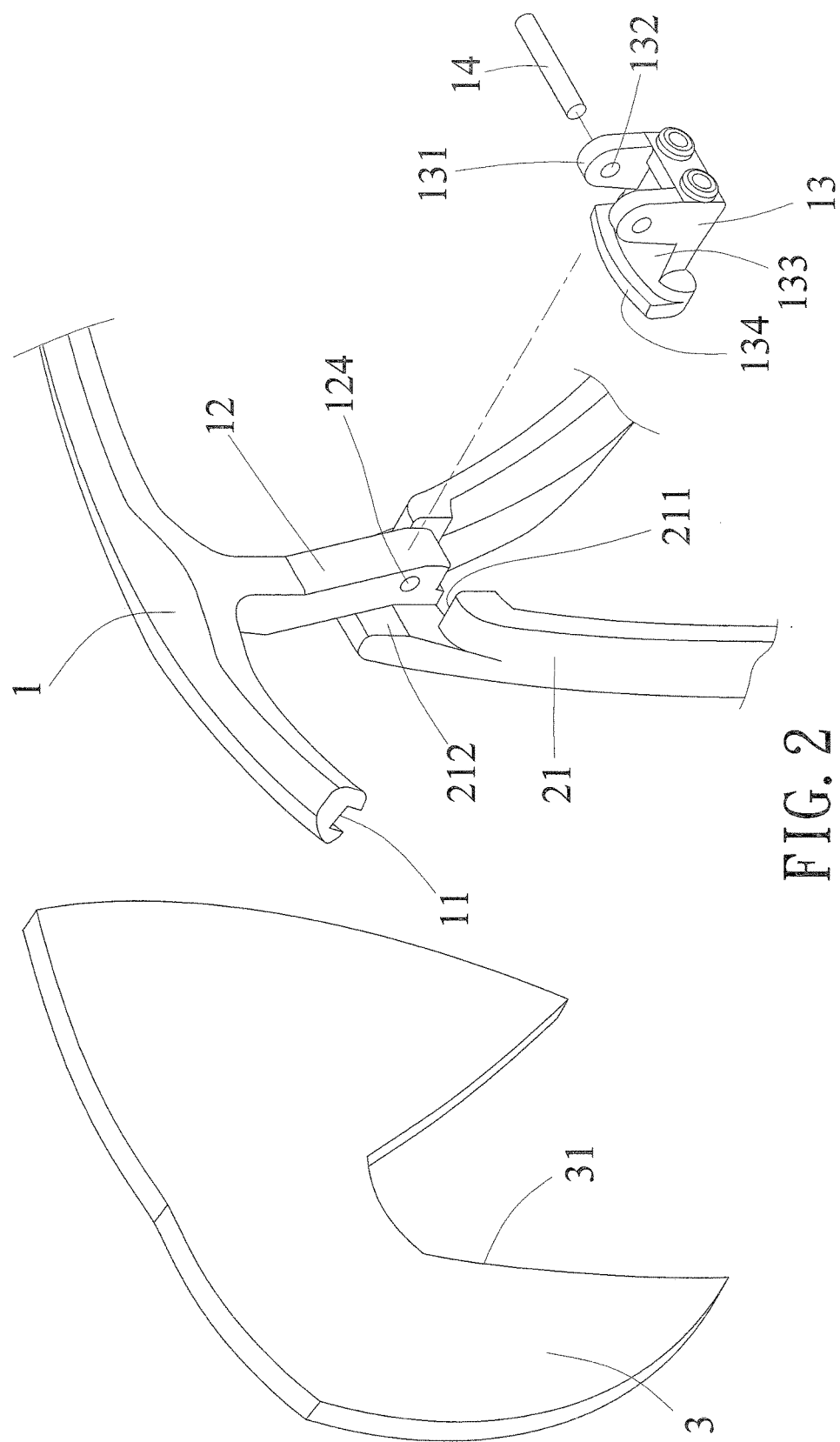
FIG. 2 is a rear perspective exploded diagram of this invention.

First, referring to FIGS. 1-2. FIGS. 1-2 shows a spectacles structure that can transform the spectacle frame. The spectacles structure mainly comprises an upper frame 1 and a lower frame 2.

The upper frame 1 has an upper lens assembling part 11 having an opening on the lower half thereof. An assembling rod 12 is mounted on a rear side of the upper lens assembling part 11 in the central part of the upper frame 1. The assembling rod 12 sequentially comprises a first straight section 121 connected to the upper lens assembling part 11, a backward inclined section 122 connected to the first straight section 121, and a second straight section 123 connected to the bottom of the inclined section 122. Furthermore, a first pivot hole 124 is disposed at the bottom of the second straight section 123 of the assembling rod 12. A fixing part 13 having two lugs 131 disposed on two rear sides thereof is provided. The bottom terminal of the second straight section 123 of the assembling rod 12 is disposed between the two lugs 131. In addition, two second pivot holes 132 are respectively disposed on the two lugs 131 to correspond to the first pivot hole 124 of the second straight section 123 of the assembling rod 12. A pivot 14 penetrates the second pivot holes 132 of the lugs 131 and the first pivot hole 124 of the assembling rod 12 to pivotally connect the assembling rod 12 and the fixing part 13. A flat carrying part 133 extends forward from the rear side of the fixing part 13, and a positioning flange 134 projects upward from the front side of the carrying part 133.

The central part of the lower frame 2 has a nose pad part 21 in an inverted-V shape. Two lower lens assembling parts 22 having an opening on the upper half thereof are formed on two sides of the nose pad part 21 of the lower frame 2. Therefore, the upper lens assembling part 11 of the upper frame 1 and the lower lens assembling parts 22 of the lower frame 2 can be assembled to form an intact lens assembling part. A first notch 211 is located on the front and rear sides of the central upper part of the nose pad part 21 in the inverted-V shape to form a thin connection section 212 on the central upper part of the nose pad part 21, and the rear terminal surface of the connection section 212 has a shape corresponding to the inclined section 122 and the second straight section 123 of the assembling rod 12 of the upper frame 1 to be against the front terminal surface of the assembling rod 12 of the upper frame 1. The carrying part 133 of the fixing part 13 is against the bottom side of the connection section 212, and the positioning flange 134 of the fixing part 13 is stopped by the front side of the connection section 212.

Figure 3:
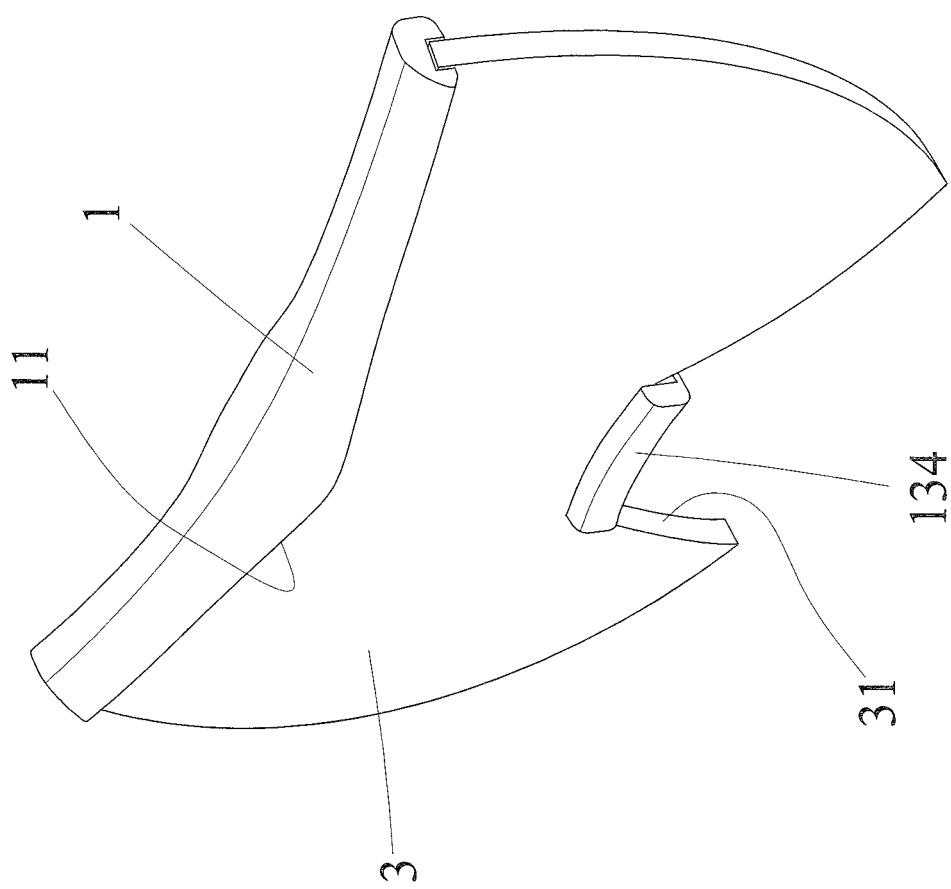
FIG. 3 is a perspective diagram of a first embodiment in this invention.
Figure 4:
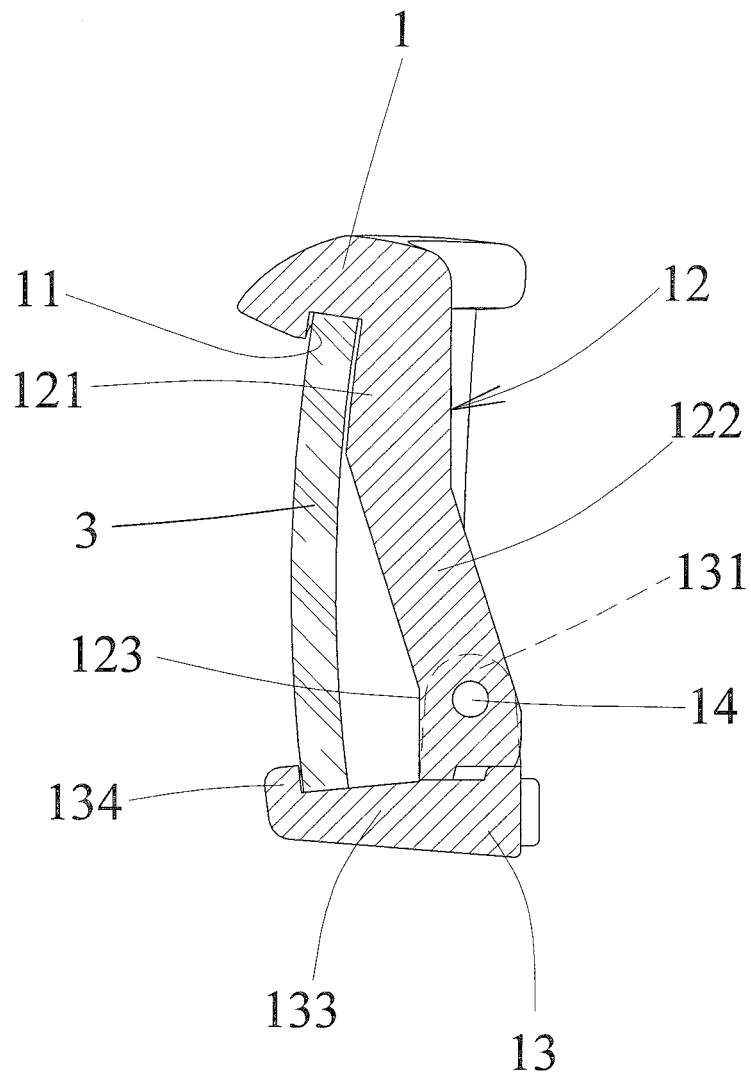
FIG. 4 is a cross-sectional diagram of the first embodiment in this invention.

Accordingly, when these parts above are assembled, two temples are respectively assembled to the two sides of the upper frame 1. Next, a lens 3 is assembled to the upper lens assembling part 11 of the upper frame 1. Referring to FIGS. 3-4, the top edge of the lens 3 will be within the opening on the lower half part of the upper lens assembling part 11 of the upper frame 1 to form a half-rim glasses. Then, the fixing part 13 is pulled upward to make the carrying part 133 of the fixing part 13 against the bottom of a second notch 31 in an inverted-V shape. The positioning flange 134 of the fixing part 13 is stopped by the front side of the lens 3 to assemble the lens 3 onto the upper frame 1. Accordingly, when a user is going to have outdoor activities or construction, the lightweight design of the half-rimmed spectacles can decrease the weight on the nose bridge and ear to increase the lightweight comfort of wearing glasses. In addition, the half-rimmed spectacles presents the appearance of neat and cool feeling to enhance the user's modeling and dressing to have trendy and fashionable feelings.

Figure 5:
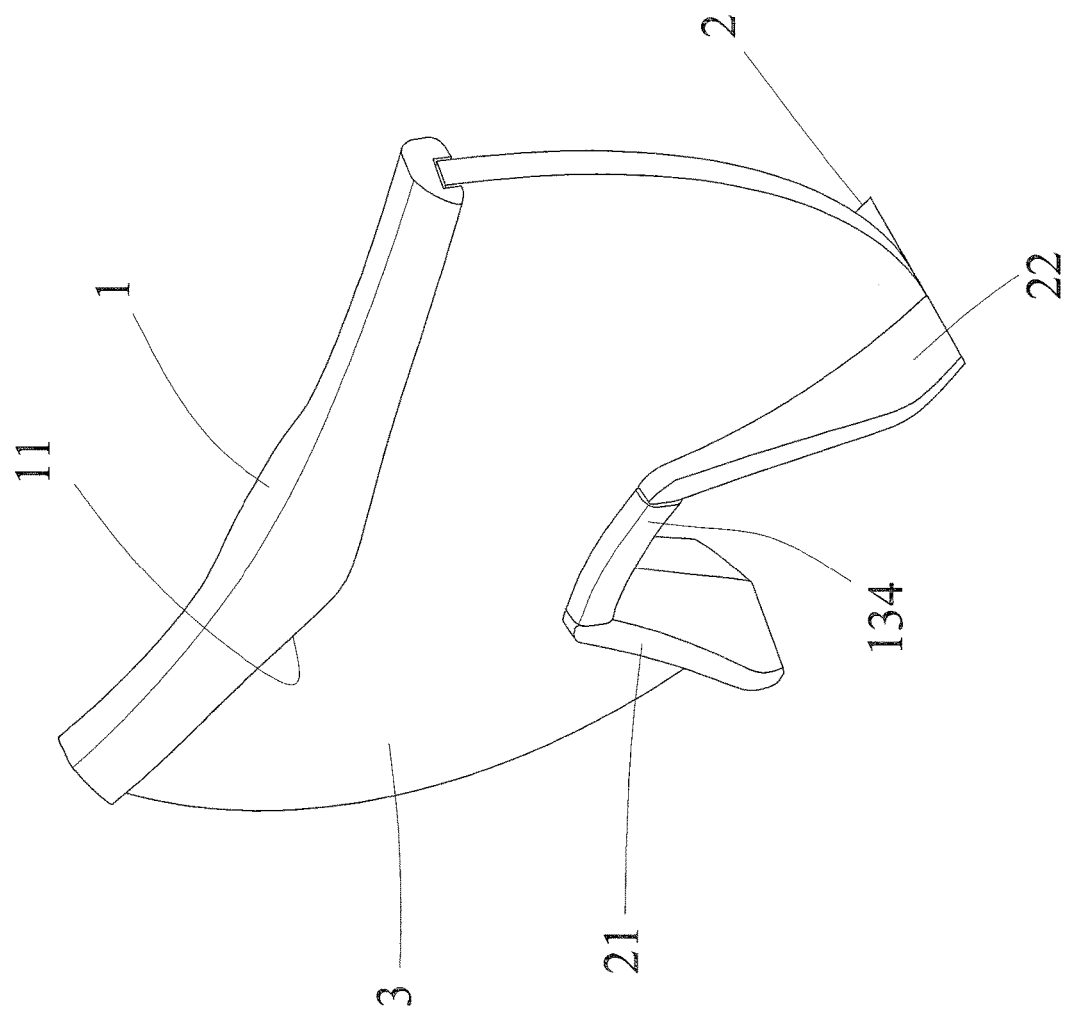
FIG. 5 is a perspective diagram of a second embodiment in this invention.
Figure 6:
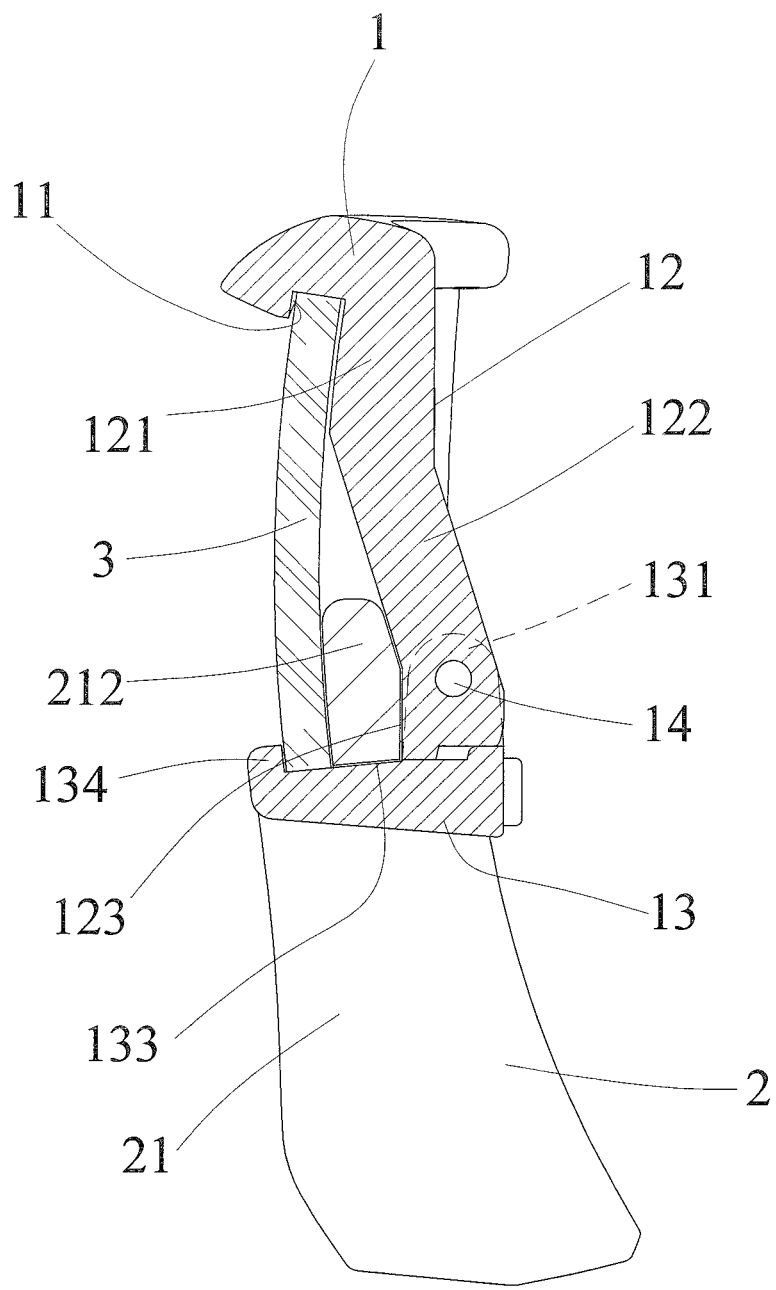
FIG. 6 is a cross-sectional diagram of the second embodiment in this invention.

Moreover, when the user wants to increase the stability and safety of the assembled lens 3, the lower frame 2 can be installed on the upper frame 1. Please refer to FIGS. 5-6. In the assembling, the rear surface of the connection section 212 on the top terminal of the nose pad part 21 of the lower frame 2 is against the front surface of the assembling rod 12 of the top frame 1. Next, the bottom edge of the upper lens assembling part 11 of the upper frame 1 is assembled correspondingly to the lower lens assembling parts 22 of the lower frame 2 to form a full-rimmed spectacles. Subsequently, the fixing part is pulled upward to support the bottom of the second notch 31 of the lens 3 and the connection section 212 of the lower frame 2, as well as the front side of the lens 3 is stopped by the positioning flange 134 of the fixing part 13 to assemble the lower frame 2, the lens 3, and the upper frame 1. Accordingly, the lens 3 is hold by the upper lens assembling part 11 of the upper frame 1 and the lower lens assembling parts 22 of the lower frame 2 to increase the assembling stability and safety. Thus, the lens 3 can be prevent from accidentally falling off. Moreover, the full-rimmed spectacles can provide rules and steady feelings to the user.

Accordingly, the design of the spectacles structure can transform the spectacle frame structure. A user can transform the spectacle structure between the half-rimmed and the full-rimmed forms according to his/her needs. Moreover, the upper frame 1 and the lower frame 3 can present different color and patterns to increase the trendy and fashionable feelings. For the consumers liking new and changing, they don't need to buy a full-rimmed spectacles and a half-rimmed spectacles as well as install lens 3 respectively in the full-rimmed spectacles and the half-rimmed spectacles to save the cost of buying spectacles. For the spectacle shops, they don't need to place the full-rimmed spectacles and half-rimmed spectacles on the shelf to provide the choices for the consumers, and thus the operating costs can be decreased.

The forgoing embodiments and diagrams are not used to limit the implementation aspects of the spectacles structure with transformable frames. The variations and modifications made by persons skilled in the art should be viewed without departing from the scope of the spectacles with transformable frames in this invention.

What is claimed is:

1. A spectacle structure with transformable frames, comprising:
   an upper frame, comprising:
   an upper lens assembling part having a lower-half opening;

an assembling rod mounted on a rear side of the upper lens assembling part in the central part of the upper frame; and a fixing part pivotally connected to the assembling rod via a rear portion of the fixing part, wherein the fixing part comprises a flat carrying part extended forward from a rear portion of the fixing part, and a positioning flange extended upward from a front terminal of the carrying part; and a lower frame, comprising:

a nose pad part with an inverted-V shape disposed on a central part of the lower frame;

two lower lens assembling parts each having an upper-half open surface and disposed on two sides of the nose pad to be assembled with the upper lens assembling part to form an intact lens assembling part; and a first notch located on the rear side of a central upper part of the nose pad part in the inverted-V shape to form a thin connection section on the central upper part of the nose pad part, wherein a rear surface of the connection section is against the front surface of the assembling rod of the upper frame, and the carrying part of the fixing part is against the bottom of the connection section, and the positioning flange of the fixing part abuts at a front side of the connection section.

2. The spectacle structure with transformable frames of claim 1, wherein the upper frame further comprises:

a first pivot hole located at a bottom of the assembling rod;

two lugs disposed on two rear sides of the fixing part and respectively each having a second pivot hole corresponding to the first pivot hole, wherein the bottom of the assembling rod is located between the two lugs; and a pivot penetrating the first pivot hole of the assembling rod and the second pivot holes of the lugs to pivotally connect the assembling rod and the fixing part.

3. The spectacle structure with transformable frames of claim 1, wherein the assembling rod of the upper frame sequentially comprises a first straight section connected to the upper lens assembling part, a backward inclined section connected to the first straight section, and a second straight section connected to a bottom of the inclined section.

4. The spectacle structure with transformable frames of claim 3, wherein the upper frame further comprises:

a first pivot hole located at a bottom of the second straight section of the assembling rod;

two lugs disposed on two rear sides of the fixing part and respectively each having a second pivot hole corresponding to the first pivot hole, wherein the bottom of the second straight section of the assembling rod is located between the two lugs; and a pivot penetrating the first pivot hole of the assembling rod and the second pivot holes of the lugs to pivotally connect the assembling rod and the fixing part.

5. The spectacle structure with transformable frames of claim 3, wherein a rear terminal surface of the connection section has a shape corresponding to the inclined section and has a shape corresponding to the second straight section of the assembling rod of the upper frame to abut against the front terminal surface of the assembling rod of the upper frame.

* * * * *